(12) United States Patent
Develyn

(10) Patent No.: US 9,558,295 B2
(45) Date of Patent: Jan. 31, 2017

(54) SYSTEM FOR DATA EXTRACTION AND PROCESSING

(75) Inventor: Richard Develyn, Blyth (GB)

(73) Assignee: KeyWordLogic Limited, Blyth, Northumberland (GB)

( * ) Notice: Subject to any disclaimer, the term of this patent is extended or adjusted under 35 U.S.C. 154(b) by 99 days.

(21) Appl. No.: 13/981,989

(22) PCT Filed: Jan. 31, 2012

(86) PCT No.: PCT/GB2012/000098
§ 371 (c)(1),
(2), (4) Date: Jul. 26, 2013

(87) PCT Pub. No.: WO2012/104583
PCT Pub. Date: Aug. 9, 2012

(65) Prior Publication Data
US 2013/0318110 A1    Nov. 28, 2013

(30) Foreign Application Priority Data

Jan. 31, 2011 (GB) .................................. 1101624.3

(51) Int. Cl.
G06F 17/30       (2006.01)
G06K 9/00       (2006.01)
G06K 9/72       (2006.01)

(52) U.S. Cl.
CPC ..... G06F 17/30943 (2013.01); G06K 9/00449 (2013.01); G06K 9/726 (2013.01); G06K 2209/01 (2013.01)

(58) Field of Classification Search
CPC  G06F 17/2264; G06F 17/2247; G06F 17/227; G06F 17/248; G06F 17/2705; G06F 17/272; G06F 17/2725; G06F 17/30914; G06F 17/30917; G06K 9/00463; G06K 9/2063; G06Q 30/04; H04N 2201/0081
(Continued)

(56) References Cited

U.S. PATENT DOCUMENTS 5,832,480 A  * 11/1998 Byrd et al.
6,298,357 B1 * 10/2001 Wexler et al. ................ 715/210
(Continued)

FOREIGN PATENT DOCUMENTS

DE      101 62 156 B4     6/2006

OTHER PUBLICATIONS

Dengel A et al: "From paper to office document standard representation", Computer, IEEE Service Center, Los Alamitos, CA, US, vol. 25, No. 7, Jul. 1, 1992 (Jul. 1, 1992) pp. 63-67.*

*Primary Examiner* — Dennis Truong
(74) *Attorney, Agent, or Firm* — Stites & Harbison, PLLC; David W. Nagle, Jr.

(57) ABSTRACT

A system for extracting and interpreting information received in a human-readable format, typically PDF, assigning field tags to the extracted information and transferring the tagged information to a data processing system so that the tagged information can be uploaded to the system automatically. The system provides an incoming document with a time stamp to enable differentiation of the incoming document from other incoming documents, then, the incoming document may be spilt into sections to enable processing of each section individually. Subsequently, context and information are extracted by allowing a processing engine to apply a predetermined set of rules so that the extracted information to be ascribed meaning and assigned a field tag depending on its meaning. The system generates an editable output which is sent to a user.

12 Claims, 5 Drawing Sheets

(58) Field of Classification Search
USPC ..... 715/234, 237; 1/1; 705/30; 707/999.006, 707/999.101, 736, 755; 382/190, 176; 706/12
See application file for complete search history.

(56) References Cited

U.S. PATENT DOCUMENTS

| | | | |
|---|---|---|---|
| 2004/0103367 A1* | 5/2004 | Riss et al. | 715/506 |
| 2006/0285772 A1* | 12/2006 | Hull et al. | 382/305 |
| 2006/0288268 A1* | 12/2006 | Srinivasan et al. | 715/505 |
| 2007/0050712 A1* | 3/2007 | Hull et al. | 715/530 |
| 2007/0052997 A1* | 3/2007 | Hull et al. | 358/1.15 |
| 2007/0078877 A1* | 4/2007 | Ungar et al. | 707/101 |
| 2007/0165904 A1* | 7/2007 | Nudd et al. | 382/100 |
| 2008/0069448 A1* | 3/2008 | Turner et al. | 382/190 |
| 2008/0177643 A1* | 7/2008 | Matthews et al. | 705/30 |
| 2008/0294426 A1* | 11/2008 | Evans et al. | 704/9 |
| 2010/0115436 A1* | 5/2010 | Embley et al. | 715/763 |
| 2011/0078098 A1* | 3/2011 | Lapir | G06F 17/27 706/12 |
| 2012/0078835 A1* | 3/2012 | Attaluri | G06F 19/322 706/52 |
| 2014/0089302 A1* | 3/2014 | Lapir | G06F 17/3053 707/723 |

* cited by examiner

Figure 1a

Invoice Number = 00337375 ← 10
Order Number = 3210210085
Invoice Date = 11 May 2008

Supplier = A Co Solutions ← 11
Supplier VAT Number = 145 8880 25
Supplier Street = 489-499 The Boulevard ← 12
Supplier City = London
Supplier Post Code = SE12WW Buyer Party = Another Company
Buyer Contact = Ros Clark
Buyer Address Line = Business Centre
Buyer Street = The Street
Buyer City = Godalming
Buyer Post Code = GU71AA Total Net = 133.37
Total VAT = 23.34
Total Invoice = 156.71

Line # = 1
Code = 6309303
Description = Cost Centre = "32102" Card Holder = "ELSTREE HOUSE" Card Number = "9826150510920438863" Date = "09/05/08" SO = "50511655" ROCHESTER PINE CHEST 4W 4N Quantity = 1 Unit Price = 63.82 VAT Rate = 17.5 VAT Code = S VAT Amount = 11.17 Net Amount = 63.82 Total Amount = 74.99 ← 13

Line # = 2
Code = 4309226
Description = Cost Centre = "32102" Card Holder = "ELSTREE HOUSE" Card Number = "9826150510920438863" Date = "09/05/08" SO = "50511655" PAIR OF CREAM BEDSIDE LAMPS Quantity = 2 Unit Price = 6.8 VAT Rate = 17.5 VAT Code = S VAT Amount = 2.38 Net Amount = 13.6 Total Amount = 15.98 ← 15

Line # = 3
Code = 6301167
Description = Cost Centre = "32102" Card Holder = "ELSTREE HOUSE" Card Number = "9826150510920438863" Date = "09/05/08" SO = "50511655" ROCHESTER PINE CHEST 4W 2N Quantity = 1 Unit Price = 51.06 VAT Rate = 17.5 VAT Code = ← 14 S VAT Amount = 8.94 Net Amount = 51.06 Total Amount = 60

Line # = 4
Code = CLDISC
Description = Cost Centre = "32102" Card Holder = "ELSTREE HOUSE" Card Number = "9826150510920438863" Date = "09/05/08" SO = "50511655" Order Discount Quantity = 1 Unit Price = -6.42 VAT Rate = 17.5 VAT Code = S VAT Amount = -1.12 Net Amount = -6.42 Total Amount = -7.54

Line # = 5
Code = 6090478
Description = Cost Centre = "32102" Card Holder = "ELSTREE HOUSE" Card Number = "9826150510920438863" Date = "09/05/08" SO = "50511655" SASHA BEECH END TABLE Quantity = 1 Unit Price = 11.91 VAT Rate = 17.5 VAT Code = S VAT Amount = 2.08 Net Amount = 11.91 Total Amount = 13.99

Line # = 6
Code = CLDISC
Description = Cost Centre = "32102" Card Holder = "ELSTREE HOUSE" Card Number = "9826150510920438863" Date = "09/05/08" SO = "50511655" Order Discount Quantity = 1 Unit Price = -0.6 VAT Rate = 17.5 VAT Code = S VAT Amount = -0.11 Net Amount = -0.6 Total Amount = -0.71

Figure 1b

Invoice

A TENT WITH A VIEW

Axis House
Suite 200
26 Little Portland Street
Edinburgh
Flintshire
KA41 6MX
United Kingdom
Tax Number: GB 80 2559 390
Company Number: 903328

Invoice Date : 16-04-2010
Invoice Number : IN_9998
Order Number: PU_4159

Delivery To :
ACME
ACME House
A Road
London
Greater London
LE43 5TY
United Kingdom Currency: GBP

| PO Number | PO Line Number | Product Code | Product Description | Quantity | Unit | Unit Price | Adjustments | Tax Value | Value (exc. VAT) |
|---|---|---|---|---|---|---|---|---|---|
| | | PRO_019 | Product019 | 9 | Box | 10.73 | (Discount) 0.00 (Charge) 0.00 | 16.90 @17.5% | 96.57 |
| | | PRO_020 | Product020 | 8 | Box | 2.07 | (Discount) 0.00 (Charge) 0.00 | 2.90 @17.5% | 16.56 |
| | | PRO_021 | Product021 | 5 | Box | 73.80 | (Discount) 0.00 (Charge) 0.00 | 64.58 @17.5% | 369.00 |
| | | PRO_022 | Product022 | 3 | Pack | 35.93 | (Discount) 0.00 (Charge) 0.00 | 18.86 @17.5% | 107.79 |
| | | PRO_024 | Product024 | 9 | Bag | 95.34 | (Discount) 0.00 (Charge) 0.00 | 150.16 @17.5% | 858.06 |
| | | PRO_025 | Product025 | 6 | Unit | 66.61 | (Discount) 0.00 (Charge) 0.00 | 69.94 @17.5% | 399.66 |
| | | PRO_026 | Product026 | 7 | Pack | 40.94 | (Discount) 0.00 (Charge) 0.00 | 50.15 @17.5% | 286.58 |

Invoice Address:
ACME
ACME House
A Road
London
Greater London
LE43 5TY
United Kingdom

| | |
|---|---|
| Sub Total | 2134.22 |
| Charge: | 0.00 |
| Discount: | 0.00 |
| VAT | 373.49 |
| Invoice Total (inc. VAT,Discounts,Charges) | 2507.71 |

Vat SubTotals

| Taxable Amount | Rate | Vat Total |
|---|---|---|
| 2,134.22 | 17.5% | 373.49 |

Figure 2a

Invoice Number = IN_9998
Order Number = PU_4159
Invoice Date = 16 April 2010

Supplier = A Tent With A View
Supplier VAT Number = 80 2559 390
Supplier Address Line = Suite 200
Supplier Address Line = Flintshire
Supplier Address Line = United Kingdom
Supplier Street = 26 Little Portland Street Supplier City = Edinburgh
Supplier Post Code = KA416MX Buyer Party = ACME
Buyer Address Line = ACME House
Buyer Address Line = Greater
Buyer Address Line = United Kingdom
Buyer Street = A Road
Buyer City = London
Buyer Post Code = LE435TY Delivery Party = ACME
Delivery Address Line = ACME House
Delivery Address Line = Greater
Delivery Address Line = United Kingdom
Delivery Street = A Road
Delivery City = London
Delivery Post Code = LE435TY Total Net = 2134.22
Total VAT = 373.49
Total Invoice = 2507.71

Line # = 1
Code = PRO_019
Description = Product019 ( unit = "Box" ) Quantity = 9 Unit Price = 10.73
VAT Rate = 17.5 VAT Code = S VAT Amount = 16.9 Net Amount = 96.57 Total Amount = 113.47

Line # = 2
Code = PRO_020
Description = Product020 ( unit = "Box" ) Quantity = 8 Unit Price = 2.07 VAT Rate = 17.5 VAT Code = S VAT Amount = 2.9 Net Amount = 16.56 Total Amount = 19.46

Line # = 3
Code = PRO_021
Description = Product021 ( unit = "Box" ) Quantity = 5 Unit Price = 73.8 VAT Rate = 17.5 VAT Code = S VAT Amount = 64.58 Net Amount = 369 Total Amount = 433.58

Line # = 4
Code = PRO_022
Description = Product022 ( unit = "Pack" ) Quantity = 3 Unit Price = 35.93 VAT Rate = 17.5 VAT Code = S VAT Amount = 18.86 Net Amount = 107.79 Total Amount = 126.65

Line # = 5
Code = PRO_024
Description = Product024 ( unit = "Bag" ) Quantity = 9 Unit Price = 95.34 VAT Rate = 17.5 VAT Code = S VAT Amount = 150.16 Net Amount = 858.06 Total Amount = 1008.22

Line # = 6
Code = PRO_025
Description = Product025 ( unit = "Unit" ) Quantity = 6 Unit Price = 66.61 VAT Rate = 17.5 VAT Code = S VAT Amount = 69.94 Net Amount = 399.66 Total Amount = 469.6

Line # = 7
Code = PRO_026
Description = Product026 ( unit = "Pack" ) Quantity = 7 Unit Price = 40.94 VAT Rate = 17.5 VAT Code = S VAT Amount = 50.15 Net Amount = 286.58 Total Amount = 336.73

Figure 2b

SYSTEM FOR DATA EXTRACTION AND PROCESSING

The present invention relates to a system for extracting and processing data within a document.

Information is data with context or meaning. For example, the word "bath" in a document is data. In the sentence "I like to bath myself in the morning", the word gains a meaning (the verb "to bath") within the context of the sentence. In an invoice line-item entry such as "1 Bath £350", the word is the description of the item which has been bought. In an address, such as "3, Lavatory Gardens, Bath, UK", the word refers to a city in Somerset. Context is generally layered, as in, for example, the City of the Address may not be the first address presented in a document.

One of the commonest forms of business documents is an invoice; this type of form will be used as an example throughout this specification; however, it is clear to those skilled in the art that the system described herein is applicable to other types of forms. Invoices are subject to a number of conflicting requirements. Typically, there will be regulatory requirements imposed by a country's fiscal authorities. In addition, an invoice will be required to clearly convey what it is for and for how much otherwise it will not be paid.

Invoice handling is still a largely manual process for most companies. Parties to a transaction will have their own IT systems to generate human readable invoices and accounting software to facilitate processing of these invoices. There are no standards in widespread use in this field but there is a desire to automate as much of the invoice handling process as possible so that data entry is minimised because data entry errors cause significant work to correct. Companies also want to adopt electronic invoicing methods so that they can save on paper, printing and postal costs. Further, companies are eager to adopt electronic invoicing methods as transmission of an electronic invoice is quicker and arguably more secure than transmission by traditional methods such as post. In addition, data included in an electronic invoice can be stored for auditing; thus, invoicing and accounting processes are more traceable and stored data can be accessed and or retrieved more efficiently.

There are a number of business to business solutions to automate this process but they suffer from the problem that they are proprietary and require suppliers to adapt their own systems to those of the customer. As they are proprietary, many are mutually incompatible and so suppliers are faced with high compliance costs. Further, business to business solutions do not often produce consumer friendly electronic invoices because consumers prefer invoices in a readily exchangeable and readable format such as Portable Document Format (PDF). Forms in readable format differ from free-flowing documents in the way in which they convey meaning. Typically, free-flowing documents use the normal grammatical rules of the relevant language, for example, they are divided into paragraphs, sentences and so on by commas or stops. In contrast, forms also communicate meaning by using additional means, for example, specific positioning on a page, headings, sub-headings, tables, different types of font, boxes, and shading.

PDF is a file format which normally only communicates data. Indeed, all that a typical PDF file conveys is which glyphs (i.e. letters, numbers, and so on) need to be drawn on a screen or printed document and how (i.e. what font, and so on) they should be drawn. The meaning of the data is determined by the human reader of the form. PDF does not include the concept of words. It is possible to use inexact techniques, such as optical character recognition (OCR) to recognise the text in a PDF file but the text in a PDF normally lacks any context and is not immediately usable for automated processing.

In information technology, a grammar is a set of rules written to derive meaning from a stream of data (i.e. words and punctuation). For example, a grammar rule stating that addresses are of the form "<house-number>","<street-name>","<city>","<country>"would correctly identify that "Bath" is the city in an address because the rule applies an expected structure to the stream of data. If a rule fails, other rules can be applied. Rules can also be applied on other rules, iterated over, embedded within each other and so on. Grammars, however, only apply to a stream of words and punctuation. Context-free grammars are a set of recursive rewriting rules used to generate patterns of strings; whereas a context-sensitive grammar is a grammar in which the margins surrounding a rule may contain a context of symbols; thus, it is a more general form of a context-free grammar.

Existing techniques for extracting data into information rely on a mix of context-sensitive grammar and geographic/word association.

Thus, there exists a general technical problem in extracting information from many types of standard electronic documents such as invoices and forms for use by a data processing application.

Both U.S. Pat. No. 5,853,480 and US Patent 2008/0069448 describe methods of textual analysis of compound text strings, for example, a person's full name, as stand-alone algorithms independent of the document context in which the data appears.

German Patent DE101622156 identifies a method for analysing the basic structure of a technical document, such as headers, figures and tables, and creating an index between these elements. However, this document does not identify the specific meaning of these or other parts of the text.

US Patent 2008/0294426 describes a method for linking semantic objects in stored documents so they can be easily maintained and updated. However, it is not concerned with the extraction and interpretation of the data from the original source.

One of the problems with the methods described above is that they cannot ascribe a meaning to spatial or other means used to convey meaning in context, such as, headings, sub-headings, tables, different types of font, boxes, and shading. Thus, the above systems suffer from the problem that they are not able to extract meaningful information from complex documents incorporating context. As a result, it is not possible to automatically extract information from standard electronic documents as they are too complex for current extraction methods.

Further, the methods described above also experience problems with speed, accuracy and efficacy because once they encounter a term which unintelligible to them; they are unable to progress with the extraction process.

According to the invention there is provided a system for extracting and processing data from a electronic document, comprising a data acquisition engine and a processing engine, wherein the data acquisition engine is adapted to extract data from the electronic document, which data comprises glyphs and at least one property spatially associated with the glyphs, characterised in that said at least one property is location and or font and or background and or shading, said processing engine is provided with a plurality of rules and a backward tracking search algorithm, at least one of which plurality of rules defines an anchor point, which anchor point comprises glyphs having a defined format, at least some of which rules describe the relationship between the extracted data and the spatial property, said processing engine being further adapted to provide a data output having a defined format, and wherein in use, the processing engine analyses the extracted data by applying the plurality of rules to determine the anchor point and to determine the probability of whether the spatial property and extracted data meet the requirements of the rules, such that the processing engines determines the best fit of the extracted data to the format of the data output and produces the data output.

Preferably, the backward tracking search algorithm assigns meaning to a term by following the steps of:
(a) defining one or more axioms;
(b) defining a hypothesis having one or more parts;
(c) applying a first part of the hypothesis to one of the axioms of step (a)
(d) determining whether a condition is true for the axiom of step (c);
wherein if the condition is true; second and subsequent parts of the hypothesis are applied to the axiom of step (d) until all parts are true,
whereas if the condition is not true, the first hypothesis is applied to any subsequent axioms.

Advantageously, the defined format comprises XML data format and the rules provide for a plurality of data tags, the processing engine being adapted to apply the tags to the extracted data in accordance with the rules. Preferably, the defined format comprises a comma separated values list, the processing engine being adapted to sort the extracted data into the desired order in accordance with the rules.

In a preferred embodiment, the rules are provided with a hierarchy and the rules are applied in the order of the hierarchy.

In another preferred embodiment, the processing engine determines the probability of compliance with the rules in dependence on statistical deviations on the spatial information.

Preferably, the anchor point is a postcode in standard format. More preferably, the processing engine is further adapted to identify addresses related to the postcode in standard format so that other address fields, such as city or country can be identified or verified by analysing the content of the extracted data and comparing the content thereof with the at least one of element spatially associated with the glyphs having a defined format. Advantageously, the system allows a plurality of anchor points to be defined by the plurality of rules.

Preferably, the processing engine is adapted to source character and pixel information from the document. More preferably, the processing engine verifies accuracy of the information by comparing a first anchor point with another anchor point.

In a preferred embodiment, the processing engine is further adapted to transfer the tagged output to a user. In another preferred embodiment, the system is further adapted to break the document into sections, which sections are logically uncorrelated, the rules being adapted to identify an anchor point in each section.

Advantageously, the processing engine enables a user to identify regular expressions by matching them to predetermined information so that the plurality of rules can be customised.

The invention addresses the problems with the prior art approach by giving consideration to visual elements used in producing and communicating meaning about the data contained in a document. Visual in this context refers to the spatial location within the document and also to other aspects such as font and shading. The present invention allows accurate extraction, verification, interpretation and transfer of data included in a non-contextual form, such as a PDF form, so that it can be loaded as structured information into data processing systems automatically. A particularly preferred embodiment of the present invention has data extraction parameters which allow fields to be defined by both meaning of the data and context, including coordinates, font, and other details. Further, the system of the present invention can search the document from top-to-bottom, bottom-to-top, left-to-right, right-to-left, inside-to-out and outside-to-in and allows the rules to be applied to the whole document in a best-fit basis; therefore, the rules adapt to the data and thus, the system achieves much higher success and accuracy rates, even in cases in which the layout of different input documents varies greatly.

In an embodiment of the invention, it is possible to derive meaning from data by looking at some of the visual elements contained within a document. For example, if the phrase "Invoice Number: 12345" is contained in a document, it is possible to deduce that "12345" is an invoice number because it is next to the word "Invoice Number". Equally, if the invoice number is always presented on the top-left-hand corner of an invoice, then again that invoice number can be deduced simply by its spatial location on the document. This technique is applicable to any data element on the document.

An exemplary embodiment of the present invention will now be described in greater detail with reference to the following figures and examples, in which:

FIG. 1a is a standard invoice from supplier A (Company A);

FIG. 1b is the output data extracted from the invoice of FIG. 1a;

FIG. 2a is a standard invoice from supplier B (A Tent With A View);

FIG. 2b is the output data extracted from the invoice of FIG. 2a; and

Figure 3:
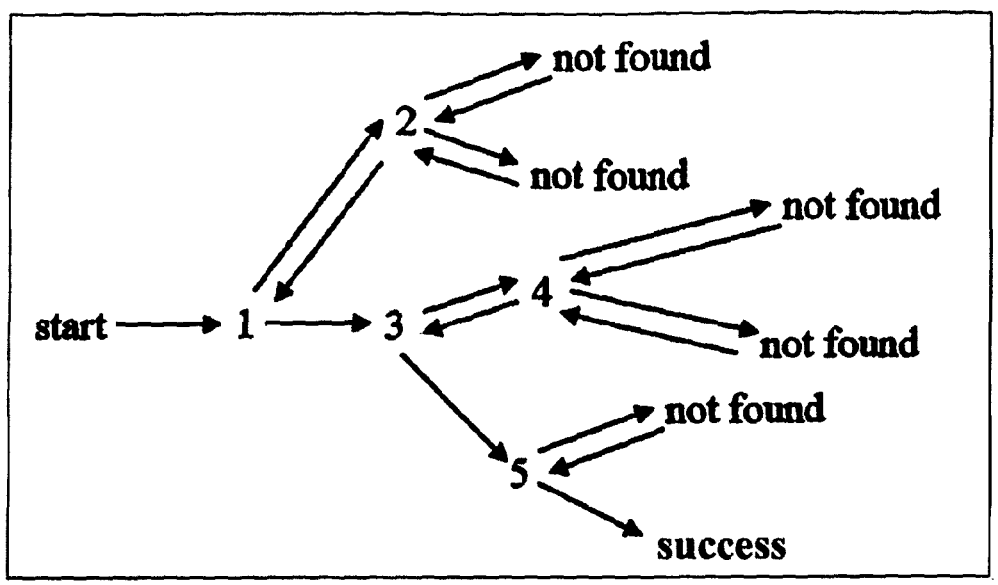
FIG. 3 illustrates a backward tracking search according to a preferred embodiment of the present invention.

In the exemplary embodiment, an information processing apparatus for processing data within a document comprises a data extraction engine and a processing engine. In use, the apparatus allows a user to insert interpretation information to be linked with character information. In this apparatus the data extraction engine extracts the data including the character information which comprises a first string of characters. Subsequently, the processing engine links the first string of characters to specific interpretation information so that the data can be ascribed meaning.

The solution of this exemplary embodiment combines context-sensitive grammars and geographical/word association by allowing a context-sensitive grammar to be written using rules which refer to visual elements of data in a document. These visual elements include the text itself plus its spatial location in the document. Optionally the elements can further include font and font size, the style of writing the text (e.g. superscript), borders, shading, colour and so on. The additional information may be beneficial depending on the nature of the document being interpreted.

The rules and checks correspond to a context-sensitive-grammar—i.e. they can be embedded in other rules, repeated, opted in and out, scanned ahead for false positives and so on.

Additionally, in order to handle the performance issues associated with rules which have a greater than normal complexity, applied to large documents, a "sectioning" system can be used to split documents up into independent, logically uncorrelated sections. Documents will typically have a sectioned structure. For forms, this structure is readily apparent. For invoices, the structure at a simple level can be seen in the differences between the address areas and the invoice content and figures. Occasionally, the structure will also coincide with the page break of the document but equally invoice content could overflow.

Exemplary rules for use in processing a form or invoice type document are given below. In this embodiment, one aspect of the address is used as an anchor point. In a U.K. context, the postcode is ideally used as an anchor point as it has a standard format. Moreover, it can also serve as an indicator of identification as each postcode will only apply to a handful of addresses. Once the postcode is identified, the system can look for related address fields such as city or county. These will generally be located spatially above the postcode and in a column or to the left of the postcode. Exemplary rules include:

- "Checking" statements to ensure that a given rule is valid given any other visual-element which needs to be checked. For example, the address rule containing <city><postcode>could state a check that city(end) <postcode(start)–100, ensuring that the geographical distance between the end of the city part of the address and the beginning of the postcode part remained within some set limit. If this limit was exceeded, the rule would fail to match the data, possibly suggesting that the postcode and the city were not part of the same contextual meaning (i.e. a particular address).
- Verifying geographical data to correctly read information, such as addresses, which appears as a series of vertically aligned lines on a page, even when these lines appear in the middle of all sorts of other unrelated data (e.g. a rule <city><other-stuff-up-to-new-line><more-stuff-at-beginning-of-following-line><postcode>with the check city(start)=postcode(start)).
- Looking at the headings of columns of data in order to determine that the correct interpretation of a "sentence" such as "1 Bath 250.50 43.84 294.34" should be One Bath for a Net Value of £250.50, VAT £43.84 and Gross Value £294.34, as opposed to, say, One Bath with an Item Value of £250,50, Delivery Charge of £43.84 and final Net Value of £294.84. By looking at the start positions of the figures being presented and comparing them to the start positions of the relevant headings the system of the invention is adapted to deduce the meaning of "sentences" where some of the figures were missing (e.g. in "1 Bath £300", the meaning of the £300 figure would depend on what column it was lining up with).
- Overcoming problems used in the presentation of data itself, such as when a document "runs on" two figures in an invoice as in "1 Bath 250.50 43.84294.34", as the system can find out where the column boundary lies and split the data accordingly. The column boundary can be recognised either by recognising the presence of a vertical line in the document or by recognising that within a section data of the same type such as a number is positioned vertically with respect to other data of the same type.

Figure 1A:
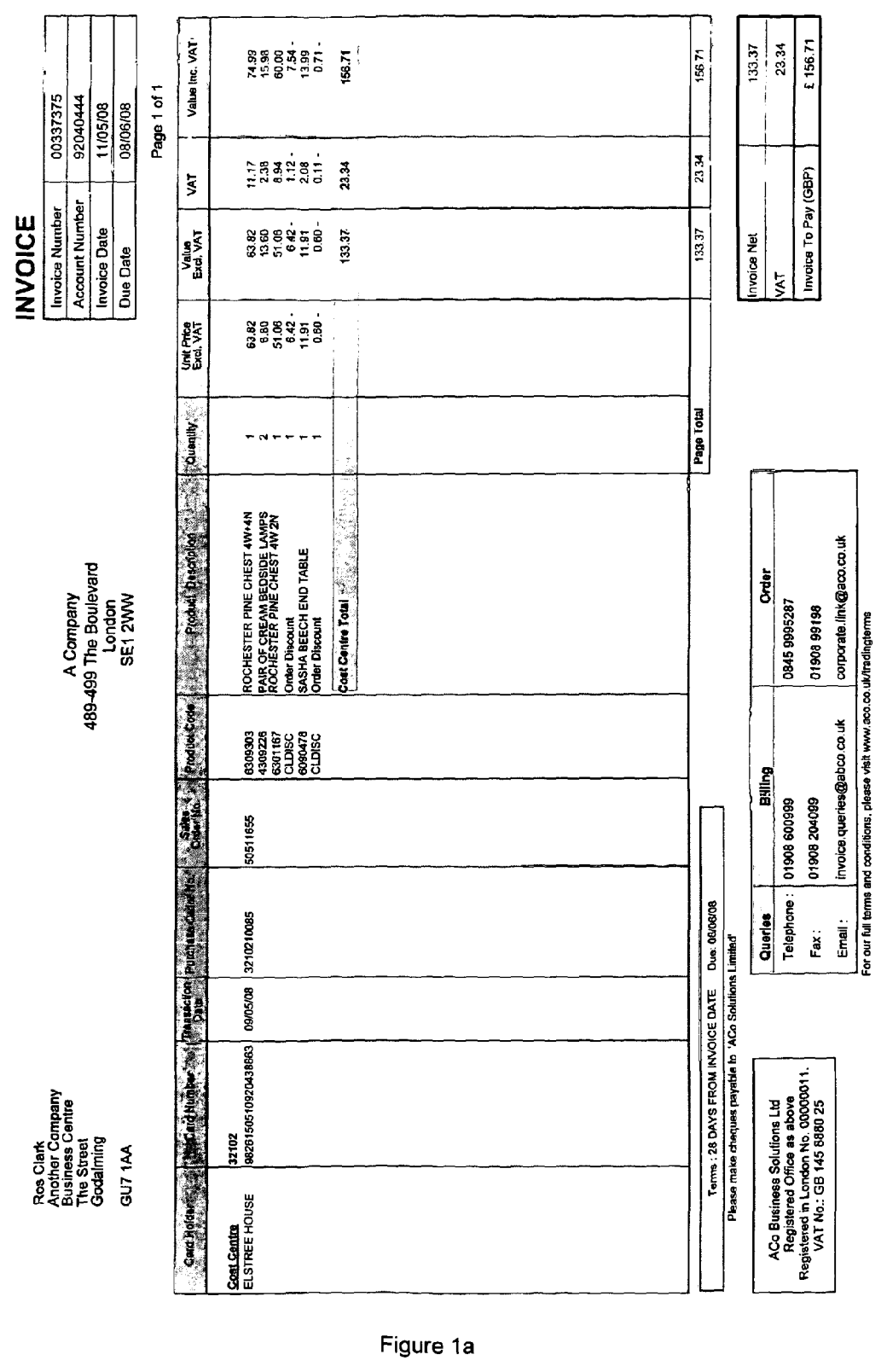

Referring now to FIG. 1a, the data presented in this document, an invoice, is received in a format having a defined structure by the system and method of the present invention. Incoming data is processed as soon at it reaches the system which system enables processing of invoices in multiple formats using individual rule files held within a supplier-based sub-directory structure. The system regularly scans these sub-directories in order to process incoming PDF files automatically on arrival. Further sub-directories within the supplier directory are used to track an incoming PDF file through time-stamping, conversion to XML, and exporting. The system starts processing an incoming file when it arrives at one of the user's sub-directories provided a predetermined set of rules is present in the supplier sub-directory and the root directory.

Typically, the first step in processing will be to provide the data with a time stamp which will allow it to be differentiated from other data.

This time-stamping process allows the system to differentiate between files of the same name arriving at different times as it is common for invoices from a specific supplier to always be given the same name, for example invoices from supplier FRED may always be received as FRED.PDF.

Subsequently, data is extracted in the following manner: firstly, the file is split into documents and the documents are split into sections because if the data were to be processed in a straightforward contextual manner, longer documents would increase the processing time almost exponentially as processing of parts is done by applying a specific sets of predetermined rules any one of which predetermined rule is dependent on previous rules. Thus, splitting documents into pages and sections and allowing each to have different starting points and overlaps. This expedites processing because the sections can be analysed independently of each other.

The system then scans time-stamped files for information extraction. This process occurs in two stages. During the first stage, the system extracts the raw data from the incoming file while during the second stage the system interprets the extracted data using a predetermined set of rules, typically written in PROLOG. Incoming files are processed provided a file including the predetermined set of rules is present. A PROLOG rules or configuration file consists of a list of comments, predicate definitions and blank lines.

As the system repeatedly scans (by applying each rule in turn) and verifies information in a document and any document is assigned a different number of starting points, the system can extract and interpret data extracted from each different starting point. Moreover, the system extracts data from sections in which exceptions to normal rules apply, i.e. has disambiguation areas. Consequently, the system is capable of extracting data in a highly accurate way because the information source is bi-dimensional; i.e. the system sources both pixel information and object information, this means the system will analyse absolute location, font, background, shading, etc and will use all this information to interpret data and identify its meaning. The system extracts the data directly from the source documents or forms. Accordingly, extracted data can be interpreted in context.

Further, the system is set up so that it can identify regular expressions by matching them to predetermined information. The regular expression matching also uses backward tracking search techniques and automatically adapts to the precision of the data extracted from the original document. Where input data is uncertain, for example where data has been taken from a source document by OCR or handwriting recognition and for each character there is a set of alternatives each with a probability, the regular expression matching uses these probabilities to find the best match.

In a preferred embodiment, the document is received by incoming e-mail and the system analyses the data in the e-mail as a further source of information to improve data extraction and interpretation.

Once all relevant data has been extracted, the system creates a data output file, typically extensible mark-up language (XML) or comma-separated values (CSV) format depending on the requirements of the final data processing system. XML is a file format specifically suited to conveying information. XML layers "tags" in order to communicate layered "context", for example the following tag indicates that the city in the supplier's address is Bath: <supplier><address><city>Bath</city></address></supplier>. The tags used by the present invention are specific to the particular form/customer and would be configured prior to the use of the system so that the data was formatted with the correct tags for the receiving system to be able to pull in the data.

Once the output has been successfully transmitted to the end system, the files are archived.

In the invoice of FIG. 1a, the invoice details are shown. FIG. 1b is an example of the content of an automatically generated email in tagged format which is sent to the user and which includes all data extracted from the original invoice. As shown in this figure, all invoice information is extracted and interpreted in context, thus, for example, the system is capable of extracting Invoice Number 10, Supplier Name 11 and street address 12 and VAT Rate 13, Code 14 and Amount 15 for each specific product.

Referring now to FIG. 2a, the system of the present invention uses predetermined rules which facilitate the extraction of information from a form by allowing the system to interpret the information by accessing the words and also the visual elements of the form. For example, in this invoice, searching for an address is more multifaceted than simply looking for a post code. Accordingly, the system allows the user to have more than one address in the form, as would be the case where billing and delivery addresses are different. FIG. 2a also shows a complex invoice in which there are several items which are described in a list with columns and rows in which some of the item descriptions use two or more rows. In a standard OCR system, the information included in the second row would be extracted out of context and would not follow from the row above. However, the present system allows the information to be extracted as one field by applying the above methods. Further, the invoice contains a VAT Summary which follows an entirely different format to that of the invoice in general.

FIG. 2b shows that the information is extracted and interpreted as belonging to one field. Further it is clear from the extracted information that the second row of data follows on from the first row of data and that the information should be kept together. In addition, the system is adapted to interpret the VAT Summary mentioned in relation to FIG. 2b because the context of the extracted data is recognised and therefore whether the data is in the same or a different format will not affect the output of the system, on the contrary, the system will note that the format is different for that specific part of the invoice and will be able to use this information to extract data accurately.

Referring to now to FIG. 3, there is shown a diagrammatic representation of a backward search according to a preferred embodiment of the present invention. Backtracking search is a technique used in logic programming and artificial intelligence techniques, but, to the inventors' knowledge, has never been used before in this context. In accordance with this preferred embodiment, when the search cannot recognise a term or phrase, i.e. cannot assign a specific meaning in context to it, the system will go back to the previous step in the rules analysis to look for an alternative result which would enable it to retry the same search with possible different outcomes. This process will be repeated until a meaning in context can be ascribed. Thus, if the system is, at any point, unable to determine the meaning of a term or phrase, it will go back step-by-step, including the splitting phrases into words and words into letters, when necessary, and re-apply rules to determine meaning. As a result, the system is able to find solutions unavailable in other prior art systems or methods.

More generally, in logical terms a hypothesis is true if all of its pre-conditions are true. Pre-conditions are classified as either axioms, that is self-evident truths, or hypotheses, which have to be tested. Ultimately, a hypothesis will either always be true or only be true for some given sets of axioms. The technique used is to consider each pre-condition of a hypothesis in turn and to look for a satisfying set of axioms that satisfies that pre-condition without clashing with any axioms needed for previous pre-conditions (in other words, the set of axioms needed to satisfy the hypothesis is slowly built up). If no set of satisfying axioms for a given condition can be found, then the algorithm backtracks to the previous condition to look for the next set of axioms which satisfies that. If another set of axioms for that prior condition can be found, then the algorithm moves on to the pre-condition it was considering before to see if a solution can now be found; otherwise, it backtracks further. Thus, the algorithm implies an ordering of both the axioms and hypotheses.

For example, consider the trivial hypothesis: "Is this town a sea port?"

This hypothesis breaks down into two conditions: "Is it town (A)?" and "Is it by the sea?"

The axioms to consider are:
(Axiom 1) Paris is a town
(Axiom 2) Rotterdam is a town
(Axiom 3) Munich is a town
(Axiom 4) Rotterdam is by the sea The sequence which would follow using a backtracking search algorithm would be:
1) Is it a town (call it A)?
Yes—Paris (axiom 1), so A=Paris
2) Is (Paris) by the sea?
No.
3) Back track to question (1) but only axioms from 2 onwards are considered.
So, yes again–Rotterdam (axiom 2), so A=Rotterdam
4) Is (Rotterdam) by the sea?
Yes.
5) The original hypothesis is now satisfied with A=Rotterdam.

A hypothesis which is not just based on axioms but also on other hypotheses could be: does Bath in the example of the same word used with different meanings above refer to a city? And, if so, is it in the UK?

This hypothesis breaks down into two conditions, namely: is "Bath" a city? (A) And, if so, is it in the UK? (B) The axioms to consider are:
1. Bath is a verb
2. Bath is a noun
3. Bath is a city in Maryland
4. Bath is a city in Somerset
5. Somerset is in UK The backtracking search algorithm would work its way through the hypotheses and axioms in the same way to come up with the required answer.

The sequence which would follow using a backtracking search algorithm would be:
1) Is "Bath" a city?
Following the above logic, axioms 1 and 2 would give a negative response to the first question so the system would go to axiom 3.
Yes–(axiom 3), so A=city
2) Is (Bath) in the UK?
No, it is in the United States.
3) Back track to question (1) again, but consider axiom 4.
So, yes again–city in Somerset (axiom 2), so A=city
4) Is (Somerset) in the UK, consider axiom 5?
Yes.
5) The original hypothesis is now satisfied with A=Bath is in Somerset.

The system is configured so that all activity is reported through a user interface and written into daily log files held in the root directory. Further, it should be mentioned that the system is able to extract and interpret data in a standard manner or mode but it can also be customised in accordance with user specific needs and parameters.

The invention claimed is:

1. A method for extracting and processing data from an electronic document, the method comprising the steps of:
   (a) providing a data acquisition engine and a processing engine, wherein the data acquisition engine is capable of extracting data from the electronic document, which data comprises glyphs and at least one property spatially associated with the glyphs, and wherein said at least one property is selected from the group consisting of location, font, background, and shading graphical element; and
   (b) providing said processing engine with a plurality of rules and a backward tracking search algorithm, wherein the plurality of rules are provided with a hierarchy and the rules are applied in the order of the hierarchy, wherein at least one of the plurality of rules defines an anchor point, which anchor point comprises glyphs having a defined format, and wherein at least some of the plurality of rules describe the relationship between the extracted data and the at least one property;
   wherein said processing engine is capable of providing a data output having a defined format, and wherein in use, the processing engine analyses the extracted data by applying the plurality of rules upon the anchor point to determine the probability of whether the property and extracted data meet the requirements of the rules, such that the processing engine determines the best fit of the extracted data to the format of the data output and produces the data output, wherein the method allows a plurality of anchor points to be defined by the plurality of rules.

2. The method of claim 1, wherein the backward tracking search algorithm assigns meaning to a term by following the steps of:
   (a) defining one or more axioms;
   (b) defining a hypothesis having one or more parts;
   (c) applying a first part of the hypothesis to one of the axioms of step (a); and
   (d) determining whether a condition is true for the axiom of step (c);
   wherein if the condition is true, second and subsequent parts of the hypothesis are applied to the axiom of step (d) until all parts are true,
   whereas if the condition is not true, the first hypothesis is applied to any subsequent axioms.

3. The method of claim 1, wherein the defined format comprises XML data format and the rules provide for a plurality of data tags, the processing engine being adapted to apply the tags to the extracted data in accordance with the rules.

4. The method of claim 1, wherein the defined format comprises a comma-separated values list, the processing engine being adapted to sort the extracted data into the desired order in accordance with the rules.

5. The method of claim 1, wherein the processing engine determines the probability of compliance with the rules in dependence on statistical deviations on the spatial information.

6. The method of claim 1, wherein the anchor point is a postcode in standard format.

7. The method of claim 6, wherein the processing engine is further adapted to identify addresses related to the postcode in standard format so that other address fields, such as city or country can be identified or verified by analysing the content of the extracted data and comparing the content thereof with the at least one of element spatially associated with the glyphs having a defined format.

8. The method of claim 1, wherein the processing engine is adapted to source character and pixel information from the electronic document.

9. The method of claim 1, wherein the processing engine verifies accuracy of the information by comparing a first anchor point with another anchor point.

10. The method of claim 1, wherein the processing engine is further adapted to transfer the tagged output to a user.

11. The method of claim 1, wherein the method is further adapted to break the electronic document into sections, which sections are logically uncorrelated, the rules being adapted to identify an anchor point in each section.

12. The method of claim 1, wherein the processing engine is set up to identify regular expressions by matching said regular expressions to predetermined information, use backward tracking search techniques, and automatically adapt to data extracted from a document to enable the plurality of rules to be customised so that when a character has a set of alternatives, each alternative having a probability, the processing engine uses the probability to find the best match.

* * * * *